United States Patent [19]

Emmons et al.

[11] Patent Number: 5,085,024
[45] Date of Patent: Feb. 4, 1992

[54] BELT WEATHERSTRIP WITH SPIRAL RETENTION LOCK

[75] Inventors: Ronnie Emmons, Lexington, Ky.; Robert A. Vaughan, Dearborn, Mich.

[73] Assignee: The Standard Products Company, Cleveland, Ohio

[21] Appl. No.: 466,756

[22] Filed: Jan. 18, 1990

Related U.S. Application Data

[63] Continuation-in-part of Ser. No. 315,476, Feb. 24, 1989, Pat. No. 4,969,303.

[51] Int. Cl.⁵ .................... E06B 7/16; B60R 13/06
[52] U.S. Cl. .................... 52/717.1; 52/716; 296/201; 49/462; 49/491; 49/492
[58] Field of Search .......... 52/377, 490, 491, 492, 52/493, 494, 495, 374, 479, 717, 716, 823, 718; 296/201; 49/441, 490, 491, 493, 497, 496, 495

[56] References Cited

U.S. PATENT DOCUMENTS

| | | |
|---|---|---|
| 1,908,864 | 5/1933 | Reid .................... 49/441 |
| 3,005,658 | 10/1961 | McKinney ............ 49/479 |
| 3,363,364 | 1/1968 | Cadiou . |
| 3,399,448 | 9/1968 | Jackson . |
| 3,401,486 | 9/1968 | Adell . |
| 3,448,550 | 6/1969 | Herr et al. . |
| 3,934,385 | 1/1976 | Paulus et al. . |
| 4,499,689 | 2/1985 | Adell . |
| 4,696,128 | 9/1987 | Fukuhara . |
| 4,769,966 | 9/1988 | Petri . |

FOREIGN PATENT DOCUMENTS

707757 4/1954 United Kingdom ............ 49/491

Primary Examiner—John E. Murtagh
Attorney, Agent, or Firm—Harness, Dickey & Pierce

[57] ABSTRACT

A molding for attachment to a vehicle having a flange edge, said molding comprising a generally U-shaped metallic support member having in cross-section, first and second legs joined together by a web and a spiraled section formed from a portion of one leg said support member, said spiraled section extending inwardly in a channel of said support member and in opposition to the other leg of said support member. A ramp section may be formed from a portion of the first leg and extends inwardly into the channel.

24 Claims, 8 Drawing Sheets

_Fig-14_

_Fig-15_

BELT WEATHERSTRIP WITH SPIRAL RETENTION LOCK

CROSS-REFERENCE TO RELATED APPLICATION

This application is a continuation-in-part of application Ser. No. 315,476, filed Feb. 24, 1989, entitled "Belt Weatherstrip With Spiral Retention Lock", now U.S. Pat. No. 4,969,303.

BACKGROUND OF THE INVENTION

The present invention relates to a molding for attachment to an automotive vehicle. More particularly, the present invention relates to a belt weatherstrip molding for an automotive vehicle.

Belt weatherstrip molding is employed along the lower edge of a window of a door of an automotive vehicle to seal out the weather environment and to improve the appearance of the vehicle. Belt weatherstrips are generally secured to an upper metal flange or edge of an outer door panel of the vehicle. Belt weatherstrips conventionally are retained on the associated door outer panel flange by means of metal clips which are manufactured separately from the belt weatherstrip of separate pieces of metal and then are attached to the belt weatherstrip in another manufacturing step. Use of separate clips thus involves a separate manufacturing step and introduces a quality control factor.

For ease of manufacture, it is desirable that belt weatherstrip be constructed so as to be easily installed along the supporting flange or edge. On the other hand, it is also desirable that, once installed, the belt weatherstrip is strongly secured to the flange. It is generally intended during the manufacture of the automotive vehicle that the weatherstrip generally be permanently installed along the flange or edge to which it is attached. As weatherstrips are conventionally inserted on the door flanges during manufacture of vehicles, it can be said with respect to most weatherstrips that it is desirable that the weatherstrips have low insertion values but high extraction values to meet automotive assembly specifications.

In accordance with the present invention a belt weatherstrip is provided to have a spiral lock feature which provides low insertion and high extraction characteristics, thus, the weatherstrip of the present invention can be easily installed along a flange or edge which is to be sealed and yet, once installed, the weatherstrip strongly resists extraction or removal from the flange. Furthermore, the spiral lock retention means for the belt weatherstrip is provided from the metal of the belt weatherstrip itself and no separate manufacturing step is required to attach a discrete clip to the belt weatherstrip. The retention means is manufactured and positioned on the belt weatherstrip in one step during the process of manufacturing the belt weatherstrip's central support member. A belt weatherstrip made in accordance with the present invention thus conserves both manufacturing steps and metal.

Another aspect of the present invention is a downwardly projecting leg which engages flange of the door. This leg prevents or resists the belt weatherstrip made in accordance with the present invention from rotating or rocking relative to the flange.

A further aspect of the present invention is a ramp feature which guides the flange of the door into the channel to be engaged by the spiral retention feature.

Further understanding of the present invention will be had from the following disclosure and claims taken in conjunction with the drawings.

SUMMARY OF THE INVENTION

Generally speaking, the present invention is a molding for attachment to a flange edge, such as a belt weatherstrip molding for attachment to a door outer panel flange, said molding comprising:

a generally U-shaped metallic support member having in cross-section, first and second legs joined together by a web to define a channel;

a spiraled section formed from a portion of one leg of the support member, the spiraled section extending inwardly in a channel of the support member and in opposition to the other leg of the support member; and a ramp section formed from a portion of one leg of the support member to guide the flange into the channel.

DESCRIPTION OF THE PREFERRED EMBODIMENT

Figure 1:
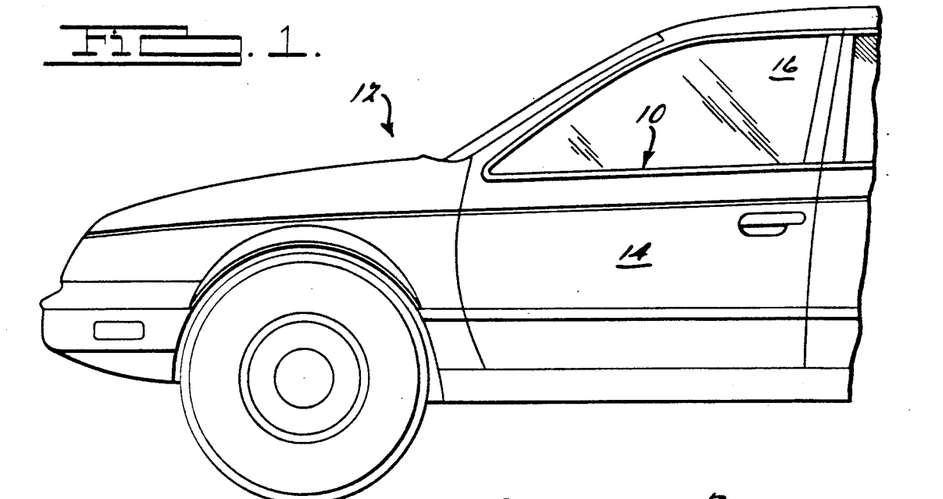
FIG. 1 is an elevational view, broken away, of an automotive vehicle having a molding of the present invention attached thereto.

A preferred embodiment of a belt weatherstrip of the present invention is indicated generally by numeral 10 and is illustrated installed on automotive vehicle 12 in FIG. 1. Molding 10 is a belt weatherstrip positioned on the upper flange of the outer panel of door 14 of automotive vehicle 12 along the bottom edge of window 16.

Figure 2:
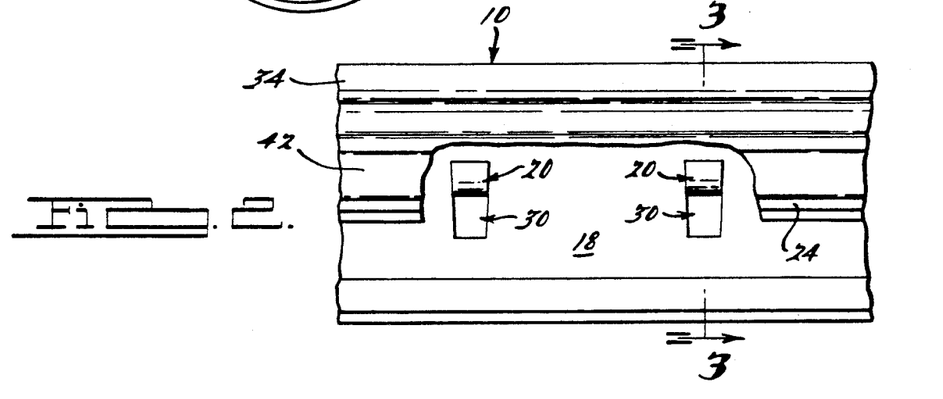
FIG. 2 is an elevational view of a preferred embodiment of the present invention with a portion broken away to show a preferred spiral lock of the present invention.
Figure 3:
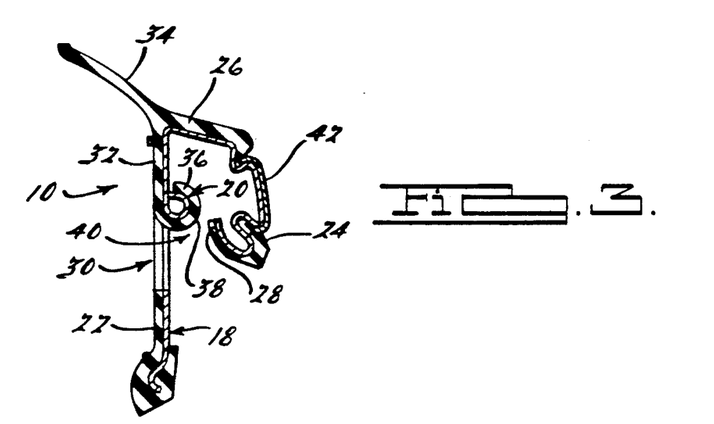
FIG. 3 is a sectional view taken along line 3—3 of FIG. 2.

As is best shown in FIGS. 2 and 3, molding 10 has, in cross-section, a generally U-shaped support member 18 with discrete spiral lock retention means sections 20.

Support member 18 is an elongated metal strip which has, in cross-section, a relatively longer leg 22 and a relatively shorter leg 24 joined by a web portion 26 to form a generally U-shaped structure. Leg 24 has a reentrantly bent free end 28. Die contour angle punched out of leg 22 are a plurality of spiraled sections 20 which are in opposition to reentrant end 28 of leg 24. Apertures 30 result from the removal of metal in the punching operation to provide spiral sections 20.

Support member 18 has an elastomeric cover 32 with window blade 34 extending therefrom in a conventional manner. Preferably, elastomeric cover 32 includes a portion 36 over spiral 20 a portion of which, indicated by numeral 38, faces in opposition to reentrant end 28. Portion 38 serves to prevent scratching of a flange inserted into channel 40 and improved retention of molding 10 thereon. Also preferably, elastomeric cover 32 has flocking or other low friction coating (not shown in the Figures) on its surface portions which will come into contact with the glass window 16. A bright strip or bead 42 of stainless steel is provided for decorative purposes along a portion of the outwardly facing side of support member 18 of molding 10.

Figure 10:
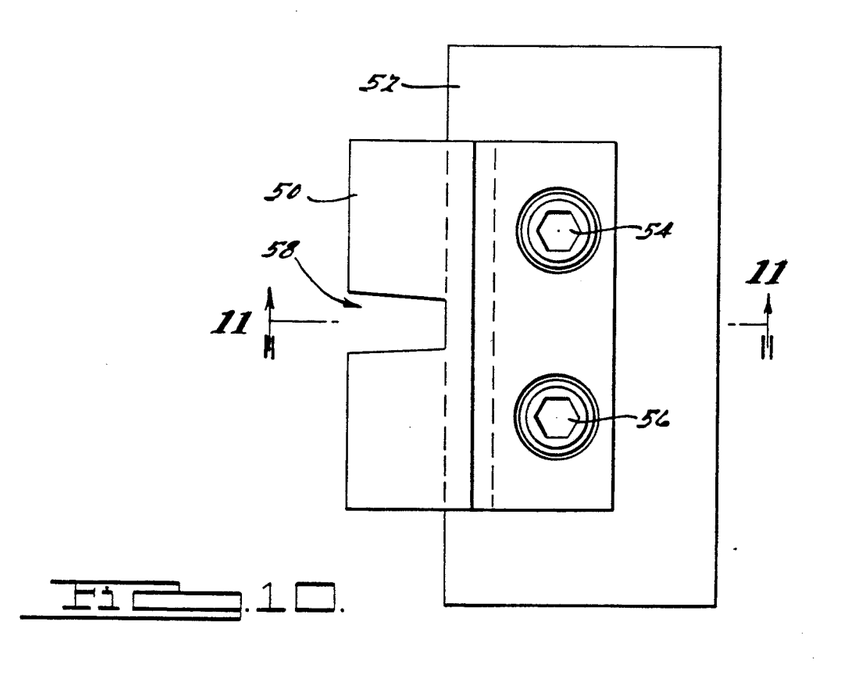
FIG. 10 is a plan view of a die block and retainer block suitable for spiral punching spiral sections of the present invention.
Figure 11:
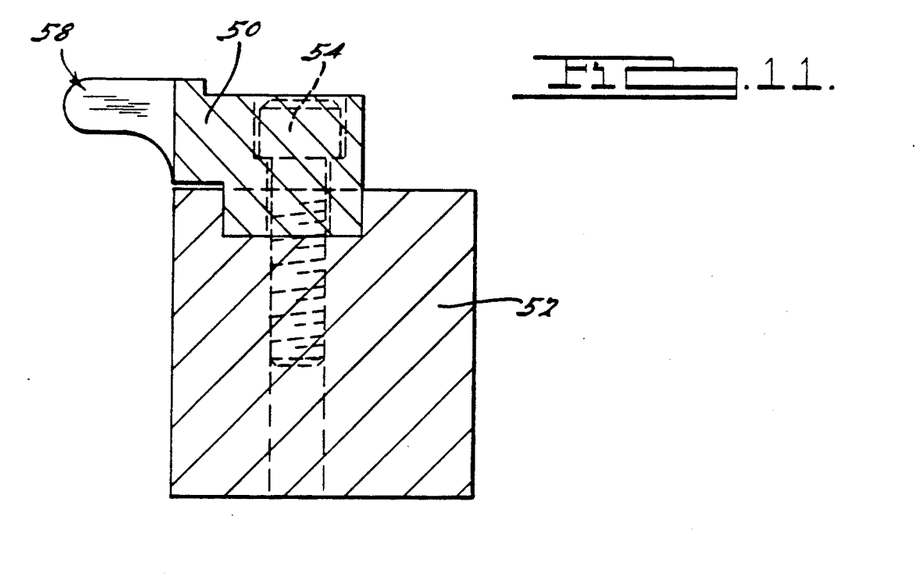
FIG. 11 is a sectional view taken along line 11—11 in FIG. 10.
Figure 12:
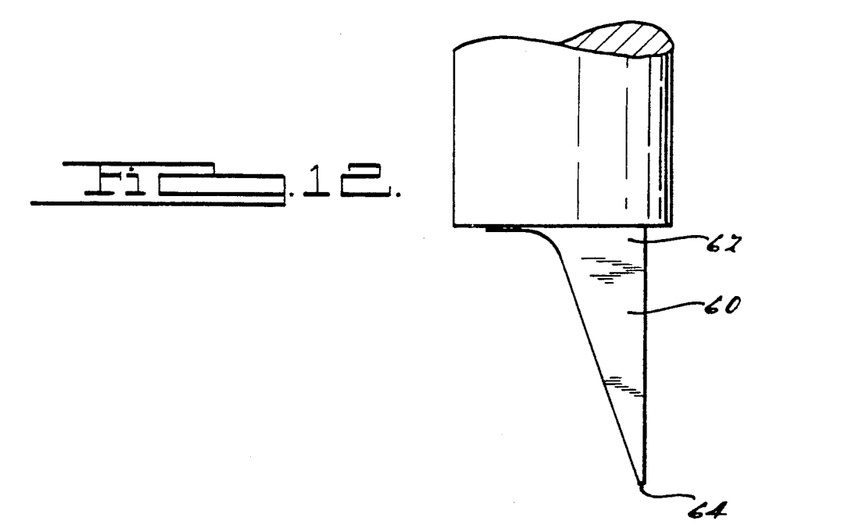
FIG. 12 is an elevational view, broken away, of a punch for use with the die block of FIG. 11.
Figure 13:
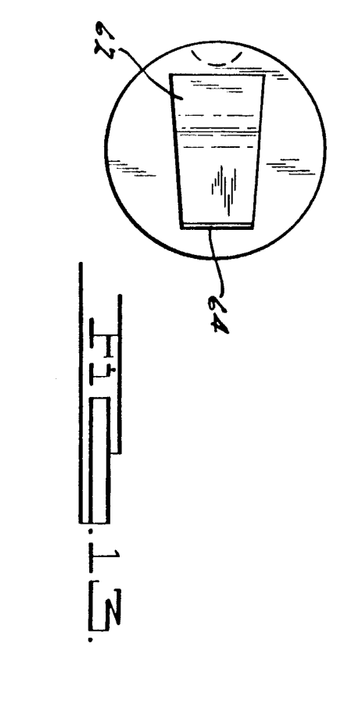
FIG. 13 is a bottom view of the punch of FIG. 12.

In the manufacture of molding 10, first a metal strip of aluminum, steel or other suitable metal is provided. The metal strip is roll formed into the generally U-shaped configuration of support member 18. Stainless steel bead 42 is snapped onto member 18 and then elastomeric cover 32 is extruded onto metal support member 18 and bonded thereto in a conventional manner. Alternatively, stainless steel bead 42 can be snapped onto member 18 after elastomeric cover 32 has been extruded and bonded thereto. Suitable elastomeric covers can comprise polyvinyl chloride or other rubber material adhesively secured to the metal carrier 18 as is conventional in the molding art. Next flock or other low friction coating is applied and cured. The manufacture is cut to desired length and then the covered metal strip is developed spiral punched to provide the spiral sections 20. This can be done by use of a conventional punch-press with a die of a suitable shape as is illustrated in FIGS. 10-13. FIGS. 10 and 11 illustrate a suitable die block 50 attached to retainer block 52 in a conventional manner by threaded elements 54 and 56. Die block 50 has notch 58 for receiving a developed punch 60 as illustrated in FIGS. 12 and 13. Punch 60 is tapered, being wider at top portion 62 than at tip 64 to provide a developed spiral in operation. Advantageously, the provision of spiral 20 in this manner provides an inwardly facing spiral section which well serves to retain molding 10 onto a flange. In this manner use of a separate clips for retention is avoided as the spiral section 20 is provided from the metal material of the support carrier 18 itself. This provides an efficient and quick manufacturing process. The number and size of spiral sections 20 can be selected to provide the desired insertion and extraction values for automotive assembly specifications. The spiral sections trap the door sheet metal pinch-weld flange between themselves, or the elastomeric cover over themselves, and the relatively shorter leg 24 of the metal support member 18 or its reentrantly bent free end 28.

Figures 4, 5:
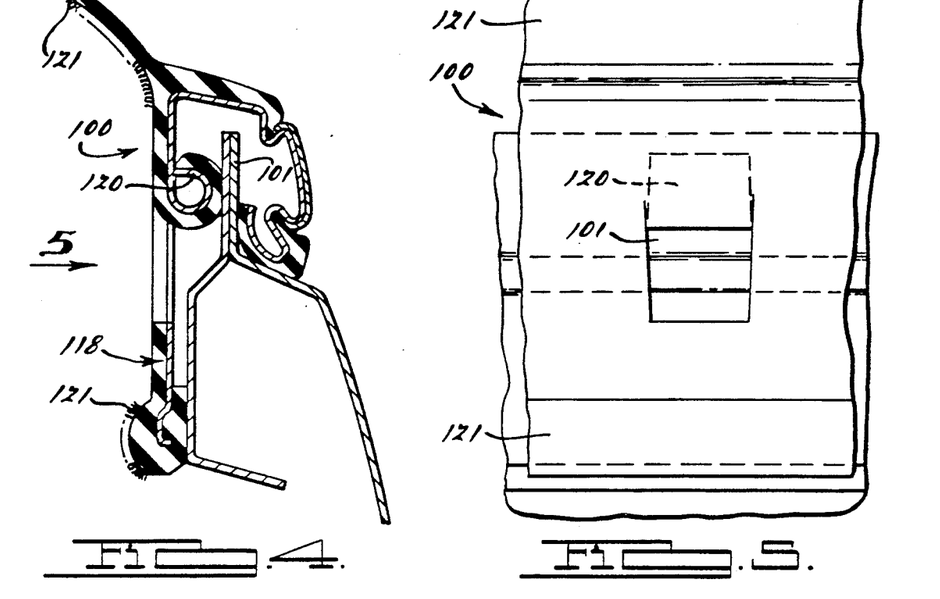
FIG. 4 is a sectional view similar to FIG. 3 but showing a first alternative preferred embodiment installed on a vehicle door flange.
FIG. 5 is an elevational view, broken away, of the embodiment of FIG. 4 as viewed in the direction indicated by arrow 5 in FIG. 4.

A first alternative preferred embodiment of the present invention is shown in FIGS. 4 and 5 and indicated generally by the numeral 100. Molding 100 is a belt weatherstrip shown mounted on upper flange 101 of an outer door panel of an automotive vehicle. Molding 100 has, in cross-section, a generally U-shaped support member 118 with a plurality of spiraled sections 120 thereon.

Molding 100 is analogous to molding 10 but has spiraled sections 120 which are wider than the spiraled sections 20 of molding 10. Also, molding 100 illustrates a molding having conventional flocking thereon as indicated at 121. Flocking is provided as a low friction coating facilitating the upward and downward movement of an associated window.

Figures 6, 7:
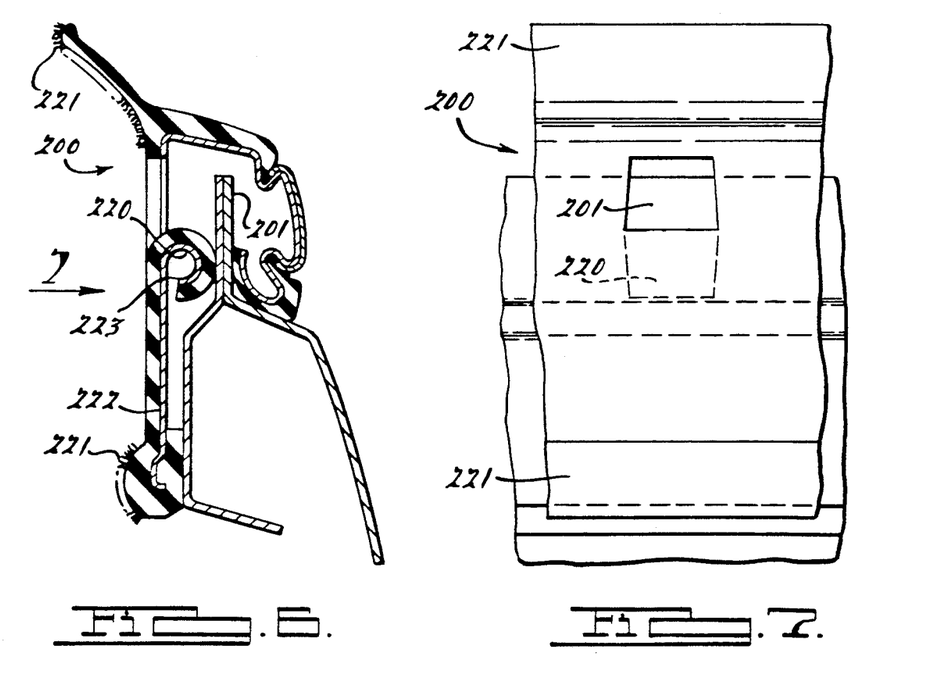
FIG. 6 is a sectional view similar to FIG. 4 but showing yet a second alternative preferred embodiment of the present invention.
FIG. 7 is an elevational view, broken away, of the embodiment of FIG. 6 as viewed in the direction indicated by arrow 7 in FIG. 6.

A second alternative embodiment is shown in FIGS. 6 and 7 and indicated generally by the numeral 200. Molding 200 is generally analogous to molding 10 but spiral sections 220 are punched from leg 222 in a clockwise direction as viewed in FIG. 6 in contrast to the counterclockwise direction of spiral sections 20 of molding 10 as viewed in FIG. 3. Also, free end 223 of spiral 220 is spaced from associated leg 222 a slight distance. This provides somewhat more spring or "give" in spiral 220 when secured onto flange 201. Molding 200 also illustrates the use of flock 221 as a low friction coating to facilitate upward and downward window movement.

Figure 8:
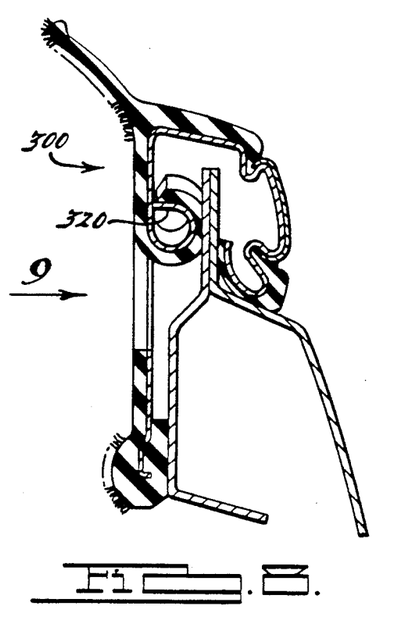
FIG. 8 is a sectional view, similar to FIG. 6 but showing a third alternate preferred embodiment of the present invention.
Figure 9:
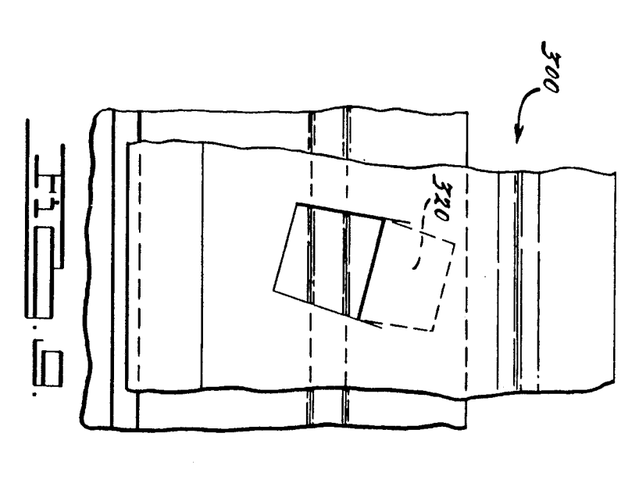
FIG. 9 is an elevational view, broken away, of the embodiment of FIG. 8 as viewed in the direction indicated by arrow 9 in FIG. 8.

A third alternative embodiment of the present invention is illustrated in FIGS. 8 and 9 and indicated generally by the numeral 300. Molding 300 is analogous to molding 10 but has spirals 320 punched out an oblique angle to the longitudinal axis of elongated molding 300.

Figure 14:
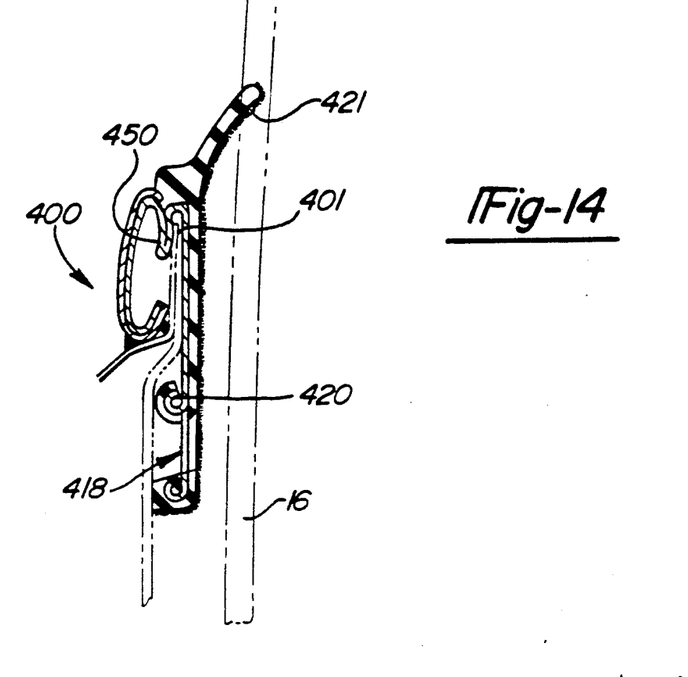
FIG. 14 is an elevational view of a fourth alternate preferred embodiment of the present invention.

A fourth alternative Preferred embodiment of the present invention is shown in FIG. 14 and indicated generally by the numeral 400. Molding 400 is a belt weatherstrip shown mounted on upper flange 401 of an outer door panel of an automotive vehicle. Molding 400 has, in cross-section, a generally U-shaped support member 418 with a plurality of spiraled sections 420 thereon.

Molding 400 is analogous to molding 10 but includes a downwardly projecting leg 450 which engages the flange 401 to prevent the molding 400 from rocking or rotating relative to the flange 401. It should be appreciated that the leg 450 may be optional and used on flanges having a narrow thickness as opposed to flange 101. Also, molding 400 illustrates a molding having conventional flocking thereon as indicated at 421. Flocking is provided as a low friction coating facilitating the upward and downward movement of an associated window 16.

Figure 15:
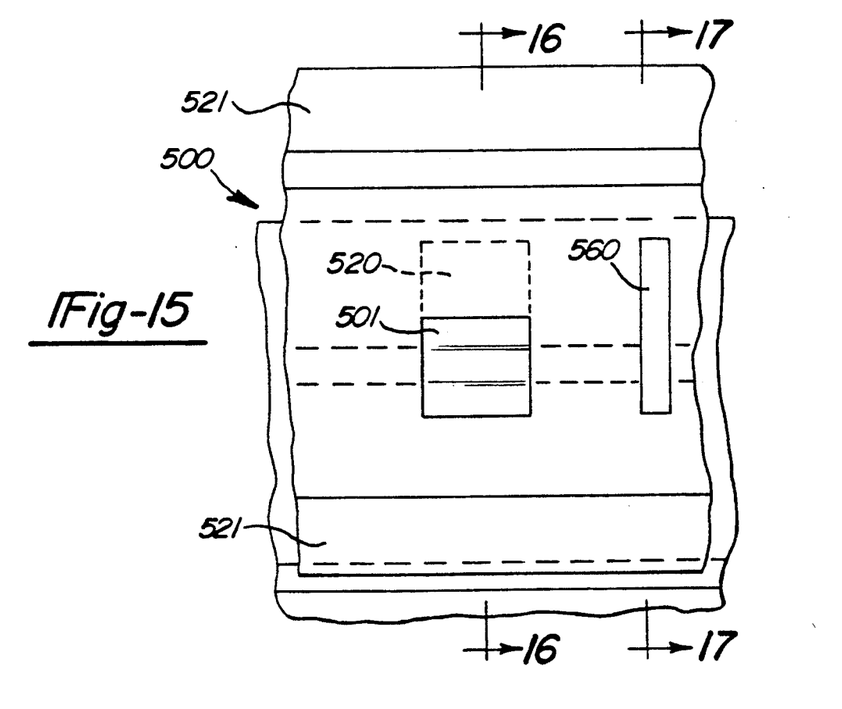
FIG. 15 is an elevational view of a fifth alternate preferred embodiment of the present invention.
Figure 16:
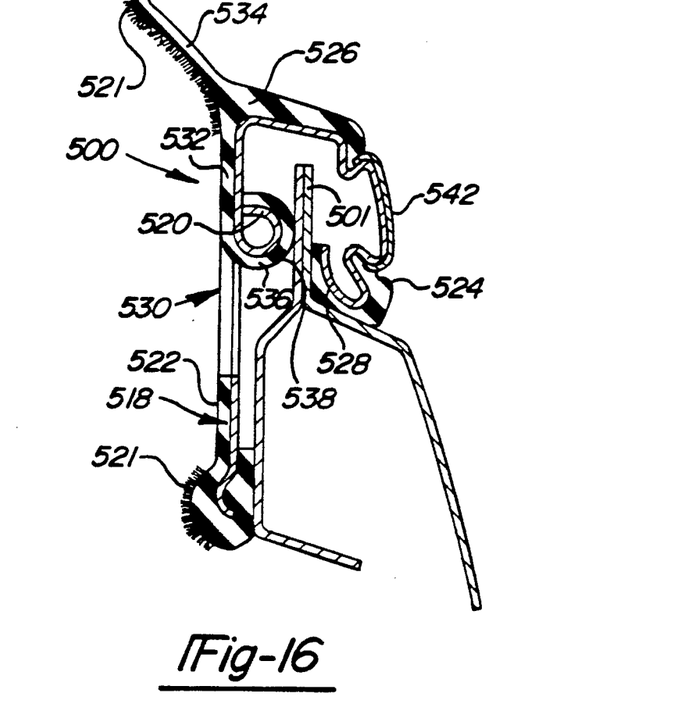
FIG. 16 is a sectional view taken along line 16—16 of FIG. 15.
Figure 17:
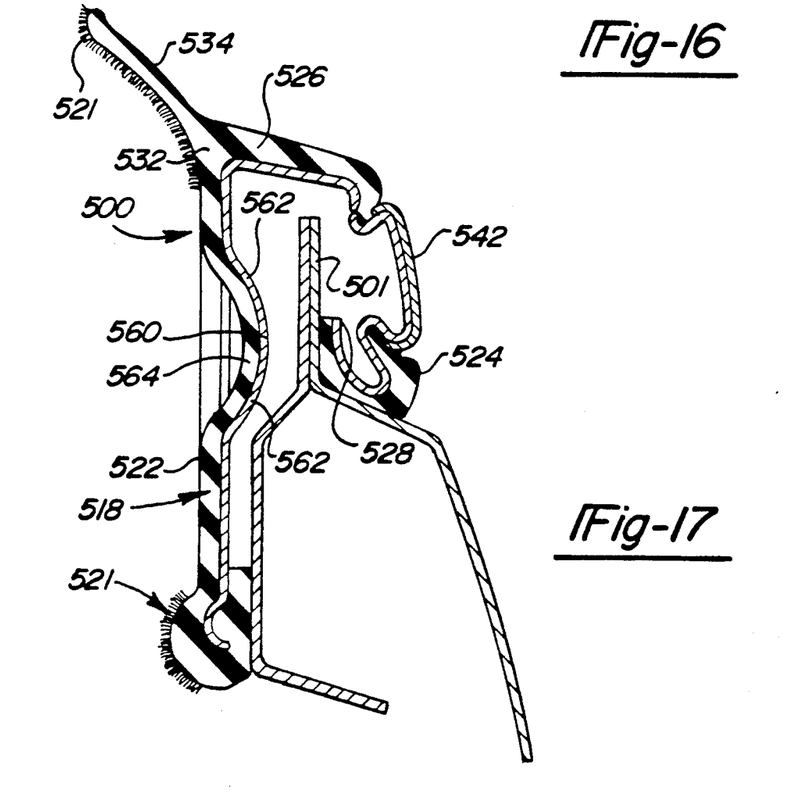
FIG. 17 is a sectional view taken along line 17—17 of FIG. 15.

Referring to FIGS. 15, 16 and 17, a fifth alternate preferred embodiment of the present invention is shown and indicated generally by the numeral 500. Molding 500 is a belt weatherstrip shown mounted on upper flange 501 of an outer door panel of an automotive vehicle. The molding 500 has, in cross-section, a generally U-shaped support member 518 with discrete spiral lock retention means sections 520 and ramp means sections 560.

Support member 518 is an elongated metal strip which has, in cross-section, a relatively longer leg 522 and a relatively shorter leg 524 joined by a web portion 526 to form a generally U-shaped structure. Leg 524 has a reentrantly bent free end 528. Die contour angle punched out of leg 522 are a plurality of spiraled sections 520 which are in opposition to reentrant end 528 of leg 524. Apertures 530 result from the removal of metal in the punching operation to provide spiral sections 520.

Support member 518 has an elastomeric cover 532 with window blade 534 extending therefrom in a conventional manner. Preferably, elastomeric cover 532 includes a portion 536 over spiral 520 a portion of which, indicated by numeral 538, faces in opposition to reentrant end 528. Portion 538 serves to prevent scratching of a flange inserted into channel 540 and improved retention of molding 500 thereon. Also preferably, elastomeric cover 532 has flocking or other low friction coating 521 on its surface portions which will come into contact with the glass window 16. A bright strip or bead 542 of stainless steel is provided for decorative purposes along a portion of the outwardly facing side of support member 518 of molding 500.

The leg 522 has a ramp section 560 which is die punched, stamped, or bent inwardly toward the leg 524. The ramp section 560 is continuous with the leg 522 at the longitudinal ends thereof. The ramp section 560 has included faces 562 which are at an angle or inclined relative to the planar portion of the leg 524. The faces 562 may be arcuate such that the ramp section 560 has a generally arcuate shape in cross-section. The faces 562 guide the flange 501 of the door into the channel such that the portion 538 of the spiral sections 520 engage the flange 501. The ramp section 560 may have a portion 564 of elastomeric cover 532 on one side. However, a portion of the cover 532 may be on the other side to prevent scratching of the flange 501 and improve retention of molding 500.

Preferably, there is at least one ramp section 560 for every spiral section 520. The ramp section 560 is spaced longitudinally from the spiral section 520. The ramp section 560 may be formed on either side of the spiral section 520. Preferably, the ramp section 560 is on the side of the spiral section 520 to guide the flange 501 into the channel prior to the spiral section 520 engaging the flange 501. For example, as the molding 500 is installed on the flange 501 moving from a forward to rearward longitudinal direction, the ramp section 560 would be forward of the spiral section 520.

Figure 18:
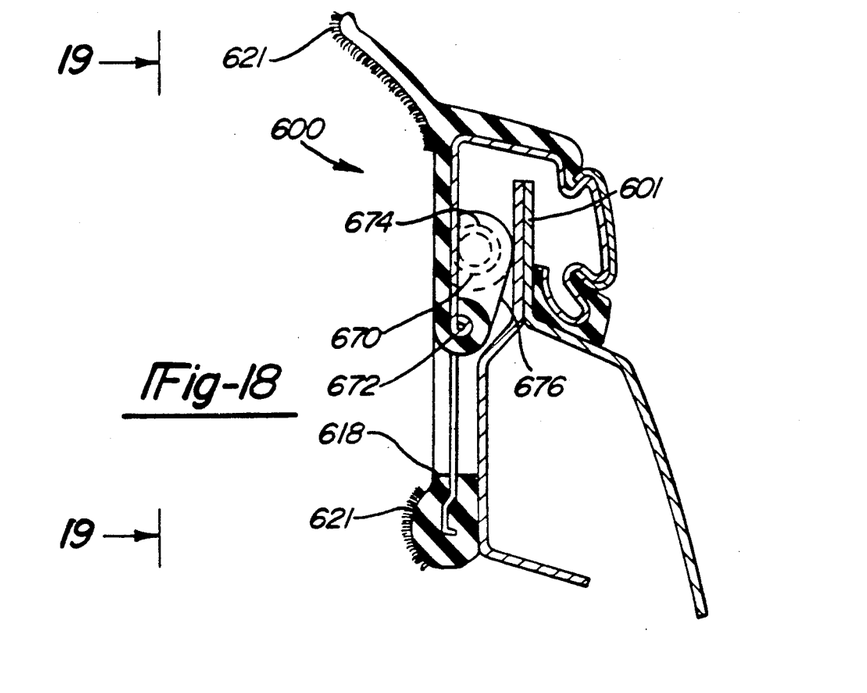
FIG. 18 is a view similar to FIG. 17 of a sixth alternate preferred embodiment of the present invention.
Figure 19:
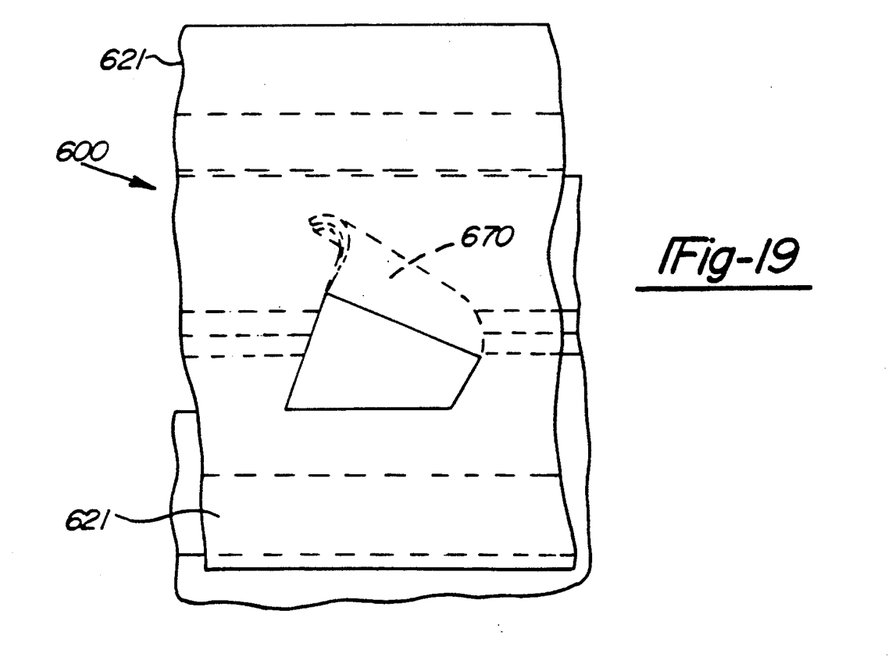
FIG. 19 is an elevational view of the embodiment of FIG. 18.

A sixth alternative preferred embodiment of the present invention is shown in FIGS. 18 and 19 and indicated generally by the numeral 600. Molding 600 is a belt weatherstrip shown mounted on upper flange 601 of an outer door panel of an automotive vehicle. Molding 600 has, in cross-section, a generally U-shaped support member 618 with a plurality of tapered spiraled ramp sections 670 thereon.

Molding 600 is analogous to molding 500 but has tapered spiraled ramp sections 670 which are tapered spirals 670 punched out an oblique angle to the longitudinal axis of elongated molding 600. The tapered spirals 670 are curled and tapered from a smaller diameter end 672 and extend to a larger diameter end 674 to provide a ramp surface 676. The ramp surface 676 functions similar to ramp section 560 to guide the flange 601 into the channel. The tapered spirals 670 also function similar to spiral sections 520. Also, molding 600 illustrates a molding having conventional flocking thereon as indicated at 621. Flocking is provided as a low friction coating facilitating the upward and downward movement of an associated window 16.

Figure 20:
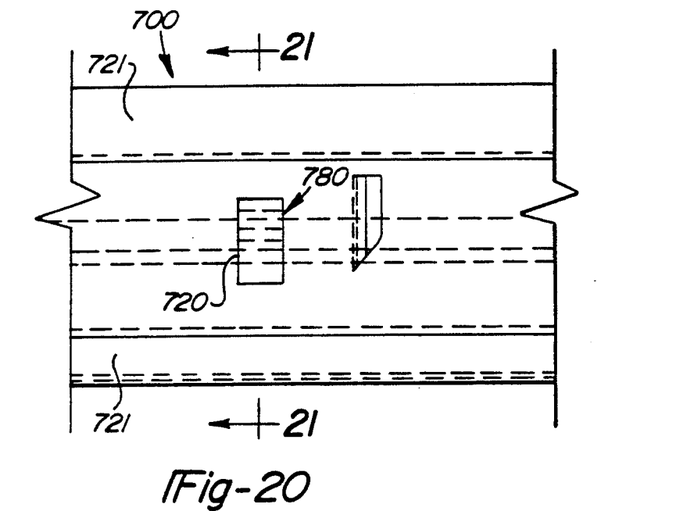
FIG. 20 is an elevational view of a seventh alternate preferred embodiment of the present invention.
Figure 21:
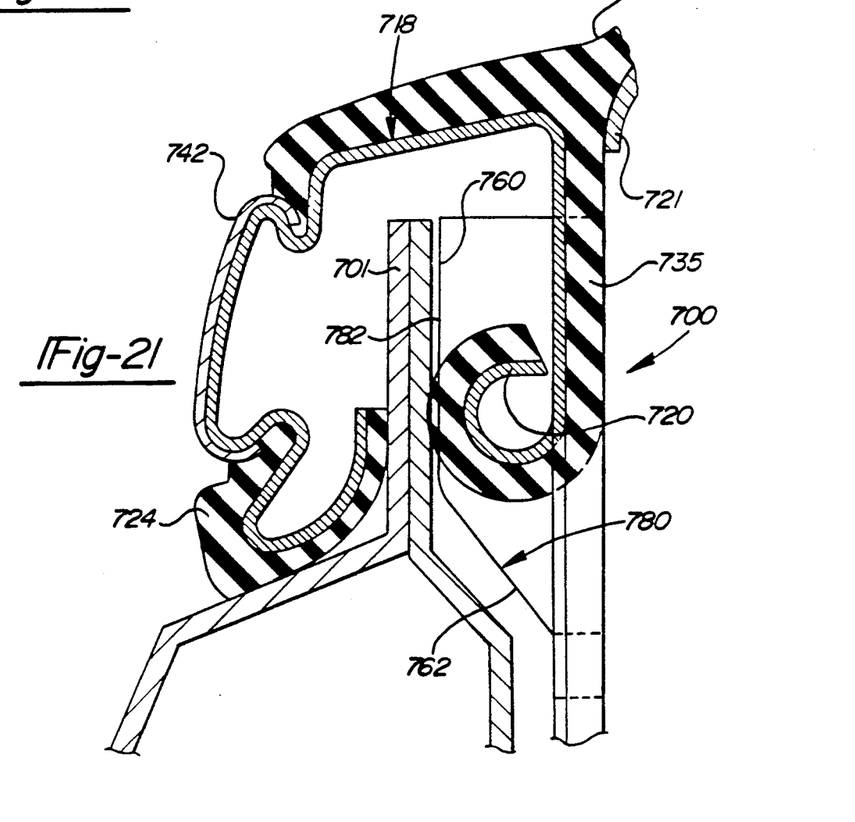
FIG. 21 is a sectional view taken along line 21—21 of FIG. 20.

Another alternative embodiment is shown in FIGS. 20 and 21 and indicated generally by the numeral 700. Molding 700 is generally analogous to molding 500 but the ramp section 760 may be formed as a tab, generally indicated at 780, which is punched from leg 722 in a direction toward the leg 724. The tab 780 has an inclined face 762 at its lower end and a generally planar vertical face 782 at its free end which is spaced from associated leg 722 a slight distance. Molding 700 also illustrates the use of flock 721 as a low friction coating to facilitate upward and downward window movement.

The present invention has been described in an illustrative matter, and it is to be understood that the terminology which has been used is intended to be in the nature of words of description rather than of limitation. Many modifications and variations of the present invention are possible in light of the above teachings. It is therefore to be understood that within the scope of the appended claims the invention may be practiced otherwise than as specifically described above.

What is claimed is:

1. A molding for attachment to a vehicle having a flange edge, said molding comprising:
    a generally U-shaped metallic support member having an elastomeric cover thereon and having, in cross-section, first and second legs joined together by a web to form a channel, said first leg being relatively longer than said second leg and said second leg having a free end which is reentrantly bent inwardly of said channel;
    a spiraled section formed from a nonterminal portion of one leg of said support member, said spiraled section extending inwardly in a channel of said support member and having a portion of said elastomeric cover bonded thereon in opposition to the other leg of said support member.

2. A molding as set forth in claim 1, wherein said second leg carries a decorative metal layer.

3. A molding as set forth in claim 1, wherein said spiraled section is tapered in lateral cross-section.

4. A molding as set forth in claim 3, wherein said spiraled section has a free end extending generally upwardly into said channel.

5. A molding as set forth in claim 4, wherein said spiraled section has a free end extending towards said opening of said channel.

6. A molding as in claim 5, wherein said spiraled section is at an oblique angle to said longitudinal axis of said molding.

7. A molding as in claim 6, wherein said spiraled section is unitary with said first leg.

8. A molding as in claim 7, wherein said spiraled section is punched from said first leg.

9. A molding as in claim 8, wherein said spiraled section comprises a portion of said first leg which has been spirally bent inwardly of said channel.

10. A molding for attachment to a vehicle having a flange edge, said molding comprising:

a generally U-shaped metallic support member having in cross-section, first and second legs joined together by a web to define a channel;

a spiraled section formed from a nonterminal portion of one leg of said support member, said spiraled section extending inwardly in a channel of said support member and in opposition to the other leg of said support member; and a ramp section formed from a portion of said one leg, said ramp portion extending inwardly in said channel.

11. A molding as set forth in claim 10, wherein said first leg is relatively longer than said second leg.

12. A molding as set forth in claim 11, wherein said second leg carries a decorative metal layer.

13. A molding as set forth in claim 11, wherein said second leg has a free end and said free end is reentrantly bent inwardly of said channel.

14. A molding as set forth in claim 13, wherein said support member has an elastomeric cover thereon.

15. A molding as set forth in claim 14, wherein said elastomeric cover is bonded to said spiraled section in opposition to said second leg.

16. A molding as set forth in claim 10 wherein said ramp section is inclined relative to said one leg.

17. A molding for attachment to a vehicle having a flange edge, said molding comprising:

a generally metallic support member having in cross-section, first and second legs joined together by a web to define a channel, said first leg being longer than said second leg, said second leg having a free end reentrantly bent inwardly with respect to said channel;

a spiraled section tapered in lateral cross-section and formed from a portion of one leg of said support member, said spiraled section extending inwardly said channel of said support member and in opposition to the other leg of said support member, said support member having an elastomeric cover over at least said spiraled section; and a ramp section formed from a portion of said one leg, said ramp portion extending inwardly in said channel.

18. A molding as set forth in claim 17, wherein said spiraled section has a free end extending generally upwardly into said channel.

19. A molding as set forth in claim 18, wherein said spiraled section has a free end extending towards said opening of said channel.

20. A molding as in claim 19, wherein said spiraled section is at an oblique angle to said longitudinal axis of said molding.

21. A molding as in claim 20, wherein said spiraled section is unitary with said first leg.

22. A molding as in claim 21, wherein said spiraled section is punched from said first leg.

23. A molding as in claim 22, wherein said spiraled section comprises a portion of said first leg which has been spirally bent inwardly of said channel.

24. A molding as in claim 17 wherein said ramp section comprises a portion of said first leg which has been bent inwardly of said channel.

* * * * *